United States Patent
Giraud et al.

(10) Patent No.: US 12,282,198 B2
(45) Date of Patent: Apr. 22, 2025

(54) DENSE WAVELENGTH DIVISION MULTIPLEXING MODULIZATION SYSTEM

(71) Applicant: CORNING RESEARCH & DEVELOPMENT CORPORATION, Corning, NY (US)

(72) Inventors: William Julius Mcphil Giraud, Azle, TX (US); Lingling Hu, Fort Worth, TX (US); Pedro Pablo Rocha Garcia, Reynosa (MX)

(73) Assignee: Corning Research & Development Corporation, Corning, NY (US)

( * ) Notice: Subject to any disclaimer, the term of this patent is extended or adjusted under 35 U.S.C. 154(b) by 208 days.

(21) Appl. No.: 17/966,976

(22) Filed: Oct. 17, 2022

(65) Prior Publication Data

US 2023/0144154 A1     May 11, 2023

Related U.S. Application Data (60) Provisional application No. 63/277,723, filed on Nov. 10, 2021.

(51) Int. Cl.
   *G02B 6/36* (2006.01)
   *G02B 6/38* (2006.01)

(52) U.S. Cl.
   CPC ........ *G02B 6/3897* (2013.01); *G02B 6/3887* (2013.01)

(58) Field of Classification Search
   CPC ............................ G02B 6/3897; G02B 6/3887; G02B 6/44526; G02B 6/44528; G02B 6/36
   See application file for complete search history.

(56) References Cited

U.S. PATENT DOCUMENTS

| | | | |
|---|---|---|---|
| 5,187,766 A | 2/1993 | Finzel et al. | |
| 5,975,769 A | 11/1999 | Larson et al. | |
| 6,591,040 B1 | 7/2003 | Dempewolf et al. | |
| 10,018,787 B1* | 7/2018 | Wang | G02B 6/3845 |
| 10,514,518 B1 | 12/2019 | Livingston et al. | |
| 10,715,271 B1 | 7/2020 | Cox et al. | |
| 10,809,480 B1 | 10/2020 | Cox et al. | |
| 11,131,811 B2 | 9/2021 | Wu | |
| 11,719,901 B2* | 8/2023 | Cox | H04J 14/0228 398/68 |
| 2010/0142910 A1 | 6/2010 | Hill et al. | |

(Continued)

FOREIGN PATENT DOCUMENTS

| | | |
|---|---|---|
| CN | 208477150 U | 2/2019 |
| WO | 2014/035611 A1 | 3/2014 |
| WO | 2017/162751 A1 | 9/2017 |

OTHER PUBLICATIONS

European Patent Application No. 22206706.8, Extended European Search Report, dated Mar. 20, 2023; 11 pages; European Patent Office.

(Continued)

*Primary Examiner* — Jennifer Doan (57) ABSTRACT

The present disclosure relates to a fiber optic assembly that includes a body and a lid coupled to the body where the body and the lid each define a respective fiber routing plane. The fiber optic assembly also includes a plurality of ports on the body and a plurality of ports on the lid such that when the lid and the body are in a closed configuration, the ports of the body and the ports of the lid define a singular connection plane.

21 Claims, 9 Drawing Sheets

(56) References Cited

U.S. PATENT DOCUMENTS

2019/0037286 A1   1/2019   Ghuman et al.
2019/0140765 A1   5/2019   Ghuman
2021/0099229 A1   4/2021   Cox et al.

OTHER PUBLICATIONS

European Patent Application No. 22206706.8, Extended European Search Report, dated Jun. 23, 2023; 12 pages; European Patent Office.
Extended European Search Report, EP application No. 24154522.7, dated Jun. 11, 2024, 8 pages, EP patent office.

* cited by examiner

DENSE WAVELENGTH DIVISION MULTIPLEXING MODULIZATION SYSTEM

PRIORITY APPLICATION

This application claims the benefit of priority of U.S. Provisional Application No. 63/277,723, filed on Nov. 10, 2021, the content of which is relied upon and incorporated herein by reference in its entirety.

FIELD OF THE DISCLOSURE

The technology of the disclosure relates to dense wavelength division multiplexing provided in fiber optic apparatuses and equipment.

BACKGROUND OF THE DISCLOSURE

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections. For example, the fiber optic equipment can support interconnections between servers, storage area networks (SANs), and other equipment at data centers. Interconnections may be supported by fiber optic patch panels or modules.

The transition to deep fiber architectures, such as Remoter Phy Distribution (RPD) or 5G, significantly transforms the nature of traditional head ends into large scale 10G switched network centers. Although similar to large scale datacenters—where large strand count fiber trunks are used to interconnect the massive amount of switch ports—the distribution of individual "ports" in neighborhood nodes dramatically drives up strand counts for outside plant (OSP) fiber trunks in the same manner. OSP fiber optic network typically employ wavelength division multiplexing (WDM) technology, and particularly dense wavelength division multiplexing (DWDM) to more efficiently transport traffic. However, the resulting large scale deployment of WDM and DWDM filtering introduces new challenges for space density, channelization efficiency, and cross connection methodology.

Wavelength division multiplexing (WDM) multiplexes a number of optical carrier signals onto a single optical fiber by using different wavelengths of light. This technique enables bidirectional communications over one strand of fiber, as well as multiplication of capacity. WDM modules may utilize a plurality of optical filters, e.g. bandpass filters and channel filters, to isolate wavelengths for each channel. Some representative optical filters may include thin film filters (TTFs) and arrayed wave guide (AWG) filters. Dense wavelength division multiplexing (DWDM) increases the number of channels that can be transmitted over a single optical fiber by reducing the spacing between channels, such as 0.8/0.4 nm (100 GHz/50 GHz grid). However, when using filter methods for a DWDM deployment, an increase in the number of channels requires a corresponding increase in the number of filters. Each additional filter consumes additional space in a fiber optic assembly or module.

SUMMARY OF THE DISCLOSURE

The present disclosure relates to a fiber optic assembly that includes a body and a lid coupled to the body where the body and the lid each define a respective fiber routing plane. The fiber optic assembly also includes a plurality of ports on the body and a plurality of ports on the lid such that when the lid and the body are in a closed configuration, the ports of the body and the ports of the lid define a singular connection plane.

In one embodiment, a fiber optic assembly is provided. The fiber optic assembly comprising: a body defining a first fiber optic component routing plane; a cover configured to cover the body and the first fiber optic component routing plane; a first plurality of fiber optic components disposed in a front side of the body; and a plurality of optical filters disposed within the first fiber optic component routing plane, wherein the plurality of optical filters enable up to 450 DWDM channels; wherein the fiber optic assembly has a volume less than $10^8$ mm$^3$.

In another embodiment, the body comprises a base having at least one sidewall extending therefrom, wherein the base defines a first fiber optic component routing plane, and an interior side of the cover coupled to the body and configured to cover the body, the cover defining a second fiber optic component routing plane. In another embodiment, wherein the plurality of optical filters comprises a first plurality of optical filters and a second plurality of optical filters, and wherein the first plurality of optical filters is stacked on top of each other within the first fiber optic component routing plane and the second plurality of optical filters is stacked on top of each other within the second fiber optic component routing plane. In another embodiment, the fiber optic assembly further comprising a plurality of filter cradles disposed within the body, the plurality of filter cradles are each configured to retain some of the plurality of optical filters in two stacked rows. In another embodiment, the two stacked rows comprises a first row optical filters and a second row of optical filters, the second row of optical filters defines valleys between adjacent optical fibers in the second row of optical filters, and the first row of optical filters are disposed in the valleys defined by the second row of optical filters such that the first row of optical filters is offset from the second row of optical filters. In another embodiment, at least one optical fiber is routed from the first fiber optic component routing plane to the second fiber optic component routing plane. In another embodiment, the fiber optic assembly further comprising: a first plurality of splice protectors disposed in the first fiber optic component routing plane; and a second plurality of splice protectors in the second fiber optic component routing plane, wherein the first plurality of splice protectors are stacked on top of each other and the second plurality of splice protectors are stacked on top of each other. In another embodiment, the fiber optic assembly has a length between 250 mm and 650 mm. In another embodiment, the fiber optic assembly has a width between 250 mm and 650 mm. In another embodiment, the fiber optic assembly has a height between 5 mm and 25 mm. In another embodiment, the fiber optic assembly comprises of a single fiber optic assembly configured to fully occupy a width of a chassis. In another embodiment, the volume is less than 107 mm$^3$.

In one embodiment, a fiber optic assembly is provided. The fiber optic assembly comprising: a body defining a first fiber optic component, wherein the body comprises a base having at least one sidewall extending therefrom, wherein the base defines a first fiber optic component routing plane; a cover coupled to the body and configured to cover the body, the cover comprising an interior side of the cover coupled to the body, the cover defining a second fiber optic component routing plane; a first plurality of fiber optic ports disposed in a front side of the body; a first plurality of optical filters disposed within the first fiber optic component routing plane; a second plurality of fiber optic ports disposed in a front side of the cover; and a second plurality of optical filters disposed within the second fiber optic component routing plane.

In another embodiment, when the fiber optic assembly is in a closed position, the first plurality of fiber optic ports and the second plurality of fiber optic ports are in a single connection plane. In another embodiment, the first plurality of optical filters is stacked on top of each other within the first fiber optic component routing plane and the second plurality of optical filters is stacked on top of each other within the second fiber optic component routing plane. In another embodiment, the first plurality of optical filters and the second plurality of optical filters enable up to 450 DWDM channels. In another embodiment, at least one optical fiber is routed from the first fiber optic component routing plane to the second fiber optic component routing plane. In another embodiment, the fiber optic assembly, further including a first plurality of splice protectors disposed in the first fiber optic component routing plane and a second plurality of splice protectors in the second fiber optic component routing plane; wherein the first plurality of splice protectors are stacked on top of each other and the second plurality of splice protectors are stacked on top of each other. In another embodiment, the fiber optic component routing plane is less than 108 $mm^3$. In another embodiment, when the fiber optic assembly is in an open position, the first plurality of fiber optic ports and the second plurality of fiber optic ports are in different planes. In another embodiment, the first plurality of optical filters are operably connected to the first plurality of fiber optic ports and the second plurality of optical filters are operably connected to the second plurality of fiber optic ports.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the present disclosure relates to a fiber optic assembly that includes a body and a lid coupled to the body where the body and the lid each define a respective fiber routing plane. The fiber optic assembly also includes a plurality of ports on the body and a plurality of ports on the lid such that when the lid and the body are in a closed configuration, the ports of the body and the ports of the lid define a singular connection plane.

Figure 1:
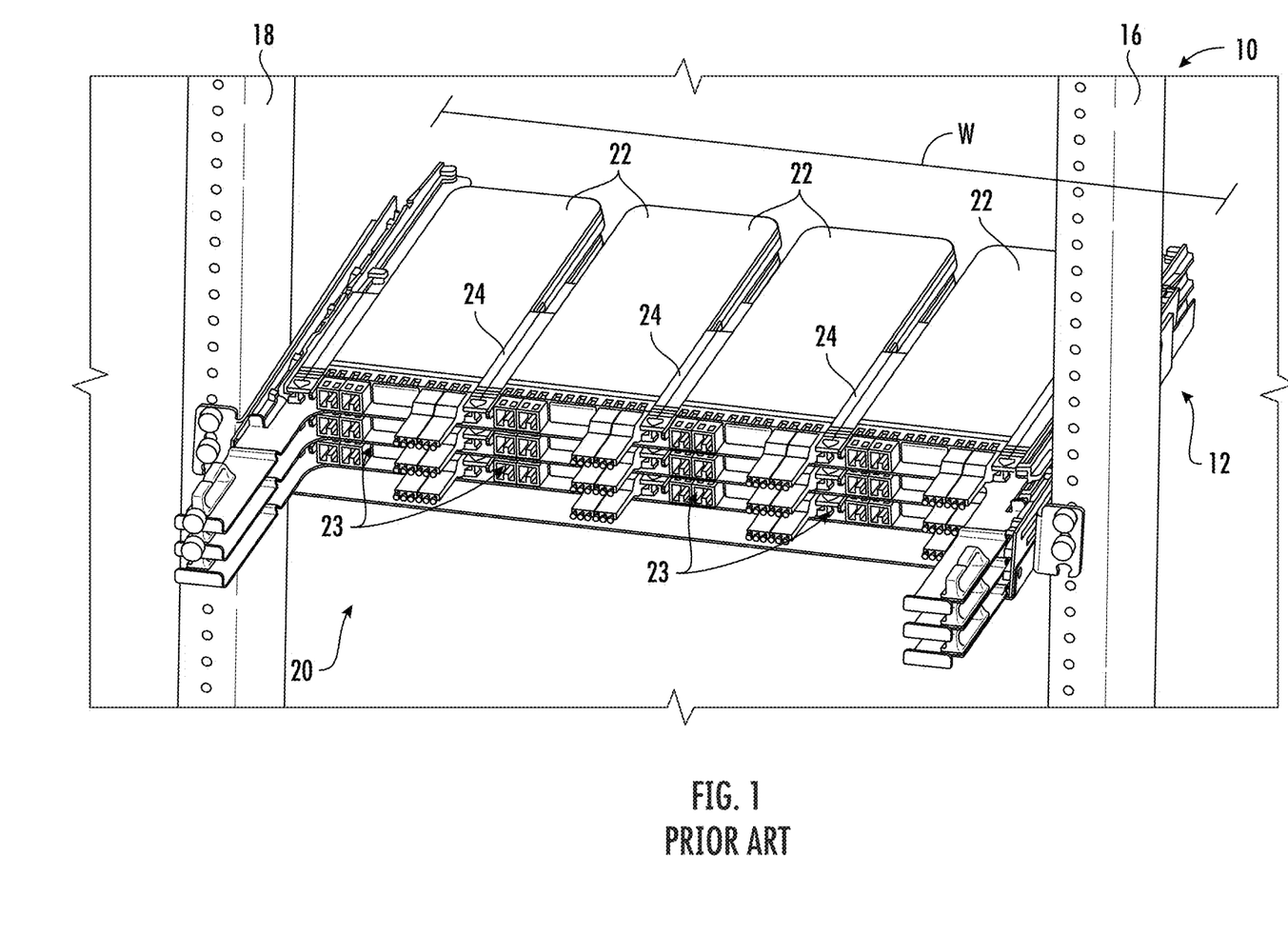
FIG. 1 is a perspective view of a conventional fiber optic equipment rack with an installed conventional 1-U size chassis supporting high-density fiber optic modules to provide a given fiber optic connection density and bandwidth capability.

Referring first to FIG. 1, a conventional fiber optic equipment 10 from a front perspective view is shown. The fiber optic equipment 10 supports high-density fiber optic assemblies that support a high fiber optic connection density and bandwidth in a 1-U space, as described below. The fiber optic equipment 10 may be provided, for example, at a data distribution center or central office, to support cable-to-cable fiber optic connections and to manage a plurality of fiber optic cable connections. In some embodiments, the fiber optic equipment 10 has one or more fiber optic equipment trays 20 that each support one or more fiber optic assemblies. Here, the fiber optic assemblies are substantially enclosed fiber optic modules 22. Fiber optic modules 22 are used throughout the specification of illustrative purposes, however, fiber optic assemblies that are not substantially enclosed may also be used. In addition to the fiber optic modules 22, the fiber optic equipment 10 could also be adapted to support one or more fiber optic patch panels, or other fiber optic equipment, that supports fiber optic components and connectivity.

The fiber optic equipment 10 includes a fiber optic equipment chassis 12 ("chassis 12"). The chassis 12 is shown as being installed in a fiber optic equipment rack. The fiber optic equipment rack 14 contains two vertical rails 16, 18 that extend vertically and include a series of apertures for facilitating attachment of the chassis 12 inside the fiber optic equipment rack. In some example embodiments, the chassis 12 may include a housing surrounding at least a portion of the chassis 12. The chassis 12 is attached and supported by the fiber optic equipment rack 14 in the form of shelves that are stacked on top of each other within the vertical rails 16, 18. The fiber optic equipment rack may support 1-U-sized shelves, with "rack unit" or "U" equal to 1.75 inches in height and nineteen (19) inches in width, as specified in EIA-310-D; published by the Electronic Industries Alliance. In certain applications, the width of "U" may be twenty-three (23) inches. Also, the term fiber optic equipment rack 14 should be understood to include structures that are cabinets, as well. In this embodiment, the chassis 12 is 1-U in size; however, the chassis 12 could be provided in a size greater than 1-U as well, such as 2-U, 4-U, or the like.

The fiber optic equipment 10 includes one or more of fixed or extendable fiber optic equipment trays 20 that each carry one or more fiber optic assemblies or fiber optic modules 22. Each fiber optic equipment tray 20 may include one or more module guides rails 24 configured to slidably receive the fiber optic modules 22. In an example embodiment, the fiber optic modules may be installable from either the front of the fiber optic equipment trays 20 the rear of the fiber optic equipment trays, or both. The chassis 12 and fiber optic equipment trays 20 support fiber optic modules 22 that support high-density fiber optic connection density and/or high density WDM channel density in a given space, including in a 1-U space.

FIG. 1 shows exemplary fiber optic components 23 disposed in the fiber optic modules 22 that support fiber optic connections. For example, the fiber optic components 23 may be fiber optic adapters or fiber optic connectors. As discussed below, the fiber optic modules 22 in this embodiment can be provided such that the fiber optic components 23 can be disposed through at least about eighty-five percent (85%) of the width of the front side or face of the fiber optic module 22, as an example. The fiber optic module 22 may include one or more fiber optic components 23. For example, the fiber optic components 23 may include multi-fiber push-on/pull-off (MPO) connectors or adapters (e.g., according to IEC 61754-7). In some examples, the fiber optic components 23 include very-small form factor (VSFF) duplex connectors or adapters, such as MDC connectors or adapters (sometimes referred to as "mini duplex connectors") offered by U.S. Conec, Ltd. (Hickory, NC), and SN connectors or adapters (sometimes referred to as a Senko Next-generation connectors) offered by Senko Advanced Components, Inc. (Marlborough, MA). Such VSFF connectors or adapters may be particularly useful in the structured optical fiber cable systems in this disclosure, and will be referred to generically as "dual-ferrule VSFF components" due to their common design characteristic of the connectors having two single-fiber ferrules within a common housing (and the adapters being configured to accept such connectors). As used herein duplex connectors include two optic fibers, one transmit optical fiber and one receive optical fiber. A multi-fiber fiber optic component, as used herein includes more than two optical fibers.

Figure 2:
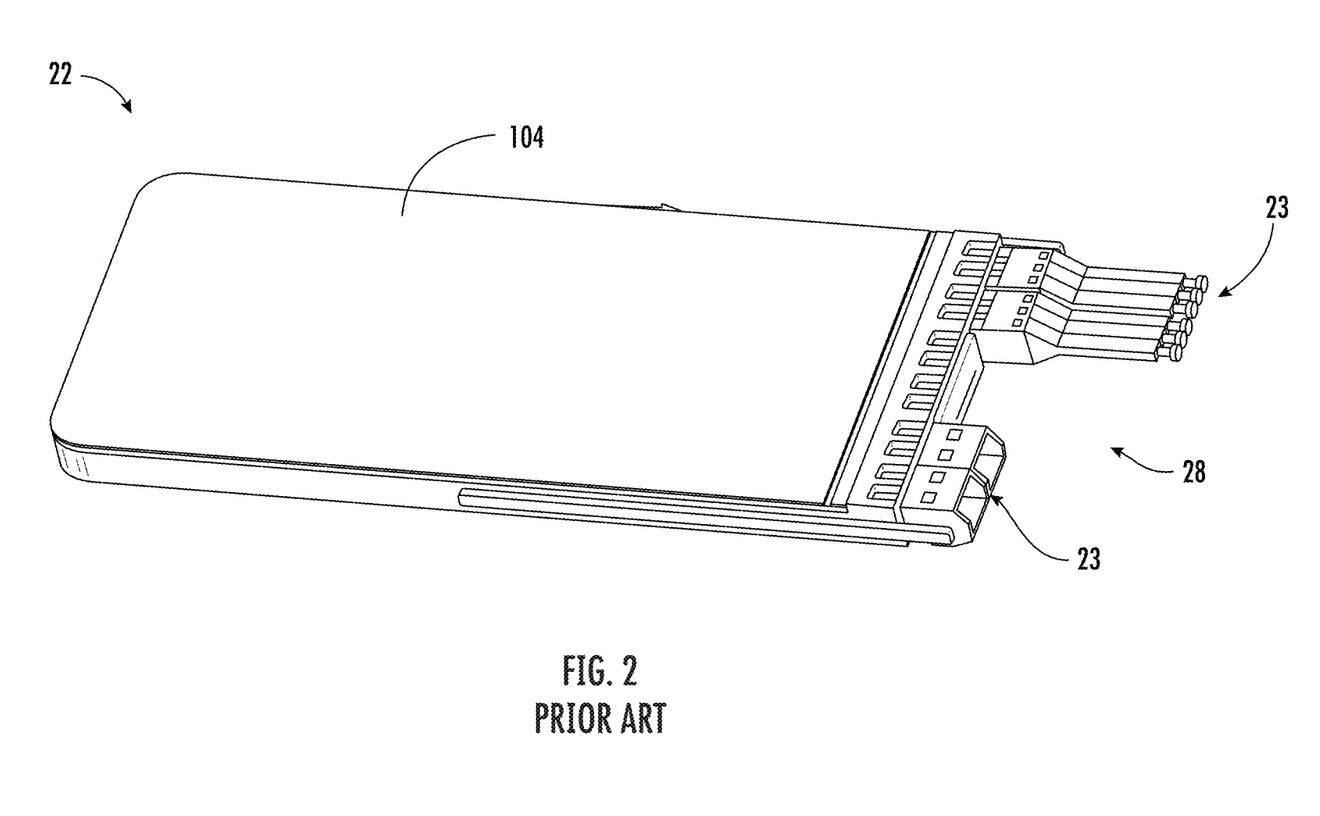
FIG. 2 is a perspective view of a fiber optic module installed in the fiber optic equipment rack of FIG. 1.

Referring now to FIG. 2, a conventional fiber optic module 22 is shown. Fiber optic module 22 configuration may provide a front opening 28 of approximately 85 millimeters (mm) or less wherein fiber optic components 23 can be disposed through the front opening 28 and at a fiber optic connection density of at least one fiber optic connection per approximately 2 mm of width or less of the front opening of the fiber optic modules 22 for dual-ferrule VSFF adapters, such as SN connector adapters or an MDC connector adapter or LC connector adapters or the like. Reference below to LC connectors and adapters and/or MDC connectors and adapters, is merely for illustrative purposes and other duplex fiber optic components, e.g. connectors and associated adapters, may also be used. In this example, eighteen (18) duplex fiber optic components may be installed in each fiber optic module 22. The fiber optic equipment trays 20 (FIG. 1) in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if eighteen (18) duplex fiber optic components were disposed in each of the twelve (12) fiber optic modules 22 installed in fiber optic equipment trays 20 of the chassis 12 as illustrated in FIG. 1, a total of four hundred thirty two (432) fiber optic connections, or two hundred sixteen (216) duplex channels (i.e., transmit and receive channels), would be supported by the chassis 12 in a 1-U space.

In the example depicted in FIG. 1, the fiber optic equipment trays 20 include module guide rails 24 disposed on each edge and three module guide rails 24 disposed at intermediate locations, between each of the fiber optic modules 22. In other embodiments, one or more of the module guide rails 24 may be removed or may be selectively removable, such as by snap fit or fasteners. Removing one or more of the module guide rails 24 may enable a larger fiber optic module to be utilized which has a larger front side face than two smaller fiber optic modules. This larger front side face may accommodate additional fiber optic components 23 as described in U.S. Pat. No. 10,715,271, granted on Jul. 14, 2020, the disclosure of which is hereby incorporated by reference herein.

Figure 3A:
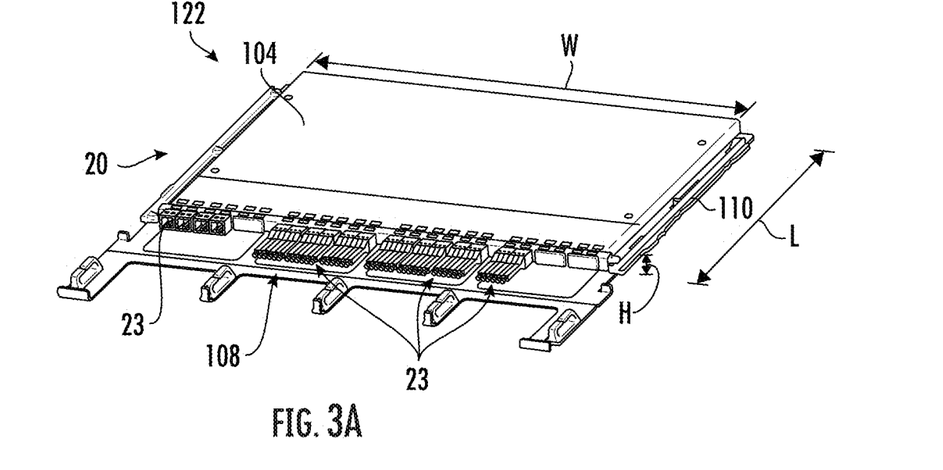
FIGS. 3A and 3B are perspective views of a fiber optic assembly to be used with the equipment rack of FIG. 1 in a closed and an open configuration, respectively.
Figure 3B:
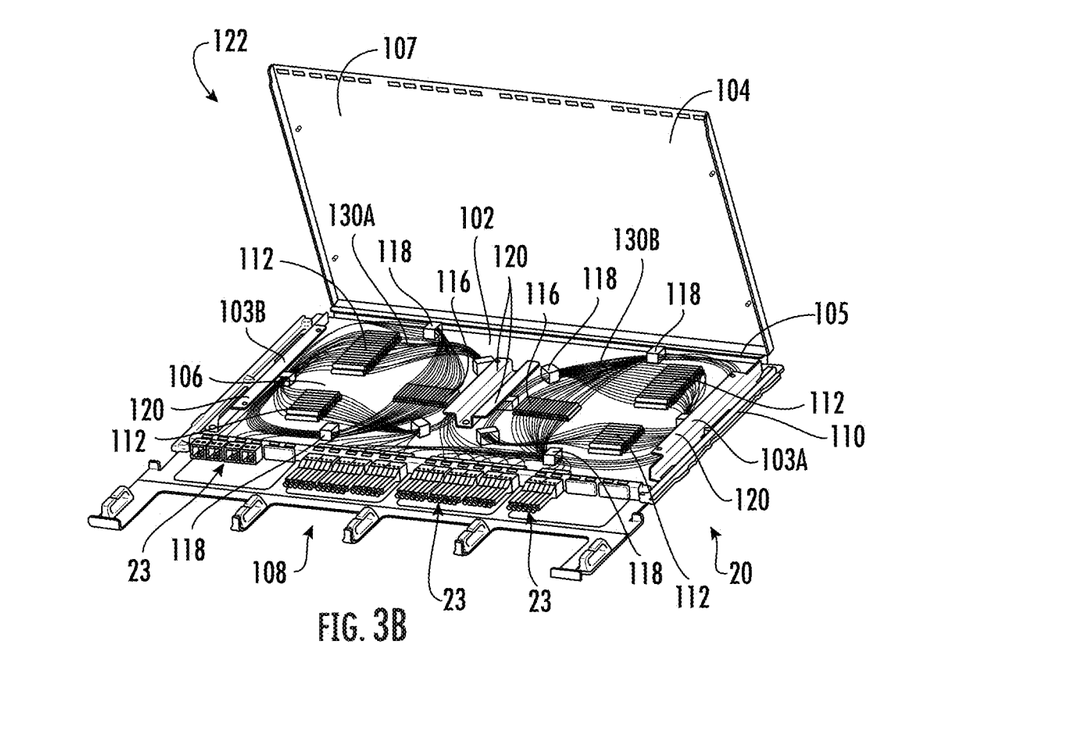

FIGS. 3A and 3B are perspective views of an exemplary fiber optic assembly of the present disclosure, particularly a substantially enclosed fiber optic module 122. The fiber optic assembly may include a base or body 102 configured to support a fiber optic arrangement. The body 102 may define a fiber routing volume, which may be fully, or partially enclosed as described below, or may be generally unenclosed. For example, the fiber routing volume defined by the body 102 of the fiber optic assembly may be fully enclosed, or a hermetically sealed volume, or it can be a volume defined by sides of the fiber optic assembly that are not fully enclosed, such as a support base, or a support base with at least one wall, ledge, or ridge.

The depicted fiber optic module 122 is comprised of the body 102 with a cover 104 coupled to body 102 such that body 102 and cover 104 are detachable with each other. In some embodiments, body 102 and cover 104 are hingedly coupled to each other at rear sidewall 105 such that body 102 and cover 104 are detachable with each other. The fiber routing volume 106 is disposed inside the body 102 and the cover 104 has an interior surface 107 that is configured to cover the fiber routing volume 106 of the body 102. The body 102 is disposed between a first side edge, an opposing second side edge, and a rear edge. In an example embodiment, a first sidewall 103A is disposed at the first side edge, a second sidewall 103B is disposed at the second side edge, and a rear sidewall 105 is disposed at the rear edge. The sidewalls 103A, 103B, 105 may be continuous or discontinuous. The cover 104 may engage one or more of the sidewalls 103A, 103B, 105 and at least partially enclose the fiber routing volume with the interior side of the cover 104. For example, the sidewalls 103A, 103B, 105 and/or cover 104 may include one or more complementary tabs and recesses, may be interference fit, or the otherwise engage each other.

As shown in FIGS. 3A and 3B, body 102 and cover 104 are configured to span a width W (FIG. 1) of chassis 12. Stated another way, fiber optic module 122 spans an entire width of chassis 12 (FIG. 1). Such a configuration provides spatial advantages in that the module guide rails 24 are removed thereby providing additional space for fiber routing and optical fiber component management within the fiber optic module 122. Stated another way, the surface area of body 102 is larger thereby providing greater internal space for corresponding optical components. Additionally, a singular fiber optic module 122 as shown provides the capability of including MUX and DeMUX applications within the same fiber optic module 122. The width (W) of the fiber optic module 122 may be based on the configuration of the fiber optic components 23. For example, the depicted fiber optic module 122 includes fiber optic components 23 configured to receive 72 duplex fiber connectors, specifically VSFF connectors. In this embodiment, the width (W) of the fiber optic module 22, e.g. the lateral distance between sides, is about 430 mm. The length (L) or depth of the fiber optic module 22, from the front side to a rear side, may be based on fiber routing and fiber management, such as minimizing bend loss by limiting or preventing sharp bends in the optical fibers. In some embodiments, a length (L) of fiber optic module 122 is about 405 mm. In some embodiments, a height (H) of fiber optic module 122 is about 12 mm. FIG. 3A shows fiber optic module 122 in a closed configuration. In the closed configuration, fiber optic module 122 has a length L ranging between 250 mm and 650 mm, between 385 mm and 650 mm, or between 385 mm and 510 mm. In some embodiments, in the closed configuration, fiber optic module 122 has a width W ranging between 250 mm and 650 mm, between 385 mm and 650 mm, or between 385 mm and 510 mm. In some embodiments, in the closed configuration, fiber optic module 122 has a height H ranging or between 5 mm and 25 mm. In some embodiments, fiber optic module 122 has a volume of less than $10^8$ mm$^3$, or less than $10^7$ mm$^3$.

Fiber optic components 23 can be disposed through a front end 108 of the main body 102 and configured to receive fiber optic connectors connected to fiber optic cables. In this example, the fiber optic components 23 are duplex MDC fiber optic adapters that are configured to receive and support connections with duplex MDC fiber optic connectors. However, any fiber optic duplex connection type desired can be provided in the fiber optic module 22. One or more module rails 110 are disposed on the first sidewall 103A and/or second sidewall 103B of the fiber optic module 122. The module rails 110 are configured to be inserted within the module guide rails 24 in the fiber optic equipment tray 20, as illustrated in FIG. 1. In this manner, when it is desired to install a fiber optic module 122 in the fiber optic equipment tray 20, the front end 108 of the fiber optic module 122 can be inserted from either the front end or the rear end of the fiber optic equipment tray 20.

In the depicted example, the fiber optic module 122 is configured to support a plurality of WDM channels, each WDM channel is defined by a particular optical wavelength. More particularly, the depicted fiber optic module 122 is configured to support ninety six (96) DWDM channels. The depicted fiber optic module 122 is merely for illustrative purposes and similar configurations may be utilized to support eight (8) DWDM channels, twelve (12) DWDM channels, thirty-six (36) DWDM channels, forty eight (48) DWDM channels, or other suitable DWDM channel densities. In some embodiments, the depicted fiber optic module 122 is configured to support up to 144 DWDM channels.

Figure 3C:
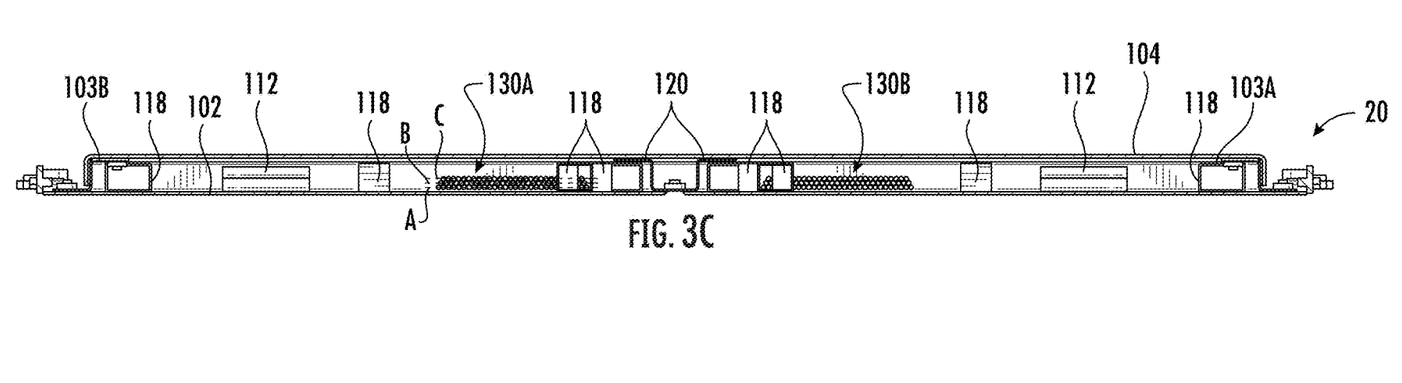
FIG. 3C is a cross-sectional view of the fiber optic module of FIG. 3B with optical fibers included, according to an example embodiment.

FIG. 3B illustrates the fiber optic module 122 in an open configuration with the cover 104 of the fiber optic module 122 hinged about rear sidewall 105 to expose the fiber routing volume 106 and other internal components of the fiber optic module 122. The fiber optic module 122 may include a plurality of optical filters 112 disposed within the fiber routing volume 106. The optical filters 112 depicted enable at least twenty-four (24) DWDM channels, as described in further detail below. Some example optical filters 112 may include thin film filters (TFFs) and/or arrayed wave guide (AWG) filters. In a preferred embodiment, the optical filters 112 comprise TTF optical filters. In some embodiments, each of optical filters 112 comprises a single optical WDM filter. In some embodiments, optical filters 112 may be retained in a predetermined position within the fiber routing volume 106 by one or more filter cradles. The optical filters 112 may be arranged to provide a particularly small the depth or height H of the fiber optic module 22. As such, the optical filters 112 may be arranged in channel groups, such as groups of at least eight (8) DWDM channels. The optical filters 112 for the DWDM channels may be disposed in offset rows (A, B, and C as shown in FIG. 3C and discussed herein). In an example embodiment, the height of the fiber optic module 122 may be about 12 mm. In some embodiments, optical filters 112 are housed in filter cradles, and additional fiber optic components may be disposed in the filter cradles, such as couplers, bandpass filters, or the like.

In an example embodiment, the fiber optic module 122 may include on or more fiber optic splice connections disposed between the optical filters 112 and the fiber optic components 23. For example, the one or more fiber optic splices may be fusion splices. The one or more fusion splices may be disposed in a splice protector sleeves 116 to prevent or limit damage to the fusion splices. The one or more splice protector sleeves 116 may also be disposed in one or more of the filter cradles. Alternatively, a thermoplastic layer may be used to protect the fusion slices. The thermoplastic layer may be similar to those described in U.S. Pat. No. 11,131, 811, titled "FIBER OPTIC CABLE ASSEMBLY WITH THERMOPLASTICALLY OVERCOATED FUSION SPLICE, AND RELATED METHOD AND APPARATUS", filed Sep. 17, 2019 the disclosure of which is fully incorporated by reference. The one or more splice protector sleeves 116 may also be disposed in one or more of the filter cradles. In some example embodiments, one or more fiber routing guides 118 may be disposed in the fiber routing volume 106. The configuration of the fiber routing guides 118 and optical filters 112 within the fiber routing volume 106 may enable fiber routing without bend loss. For example, the optical fibers may be routed such that the optical fibers maintain a bend radii of greater that about 15 mm, e.g. are routed to limit or prevent sharp bends that may cause signal of fiber degradation. An example fiber routing pattern is described below in reference to FIG. 3B.

Referring now to FIG. 3C, a cross sectional view of the routing of optical fibers 130A, 130B is shown. As shown, optical fibers 130A, 130B are each arranged in an offset row configuration. In particular, rows A, B, and C of optical fibers 130A, 130B are oriented such that a center of an optical fiber of row B of optical fibers 130A is between a pair of centers of optical fibers of row A of optical fibers 130B, and a center of an optical fiber of row C of optical fibers 130A is between a pair of centers of optical fibers of row B of optical fibers 130B.

This configuration applies to optical filters 112 where optical filters 112 of row B are offset with optical filters of row A as described above with respect to rows A, B of each of optical fibers 130A, 130B. In some embodiments, filter cradles may be used to receive a portion of optical fibers 130A, 130B and optical filters 112. Filter cradles and the corresponding configurations of optical fibers 130A, 130B within optical filters 112 are disclosed in U.S. Pat. No.

10,715,271, filed Dec. 2, 2019, the relevant disclosure of which is hereby incorporated by reference.

In some embodiments with filter cradles, the use of an epoxy is involved as described below. In this embodiment, an epoxy layer is first applied onto a surface of body 102 in a plane that is perpendicular to the orientation of filters 112. This epoxy layer is parallel with the bottom layer of the cradle, and the epoxy layer adheres the cradle onto the surface of body 102.

In embodiments without filter cradles, an epoxy is first applied onto a surface of body 102 in a plane that is perpendicular to the orientation of filters 112. Then, the filters 112 are placed onto the epoxy layer, and a second layer of epoxy is applied onto the filters 112. After the second layer of epoxy is applied onto the filters 112, a second layer of filters 112 is applied onto the second layer of epoxy. Then, a third layer of epoxy is applied onto the second layer of filters 112, and a final layer of filters 112 are applied.

In some embodiments, one or more fiber routing guides 118 may be disposed between the fiber optic components 23 and the filter 112 disposed at about one-third (⅓) the length of the fiber optic module 122. In some example embodiments, one or more fiber routing guides 118 are disposed between the filter 112 disposed at about one-third (⅓) and the filter 112 disposed at two-thirds (⅔) the length of the fiber optic module 22. Additionally or alternatively, in some embodiments, fiber routing guides 118 may be disposed between the rear sidewall 105 and the filter 112. The fiber routing guides 118 may be formed of metal, molded plastic, or a flexible material, such as rubber. In an example embodiment, the fiber routing guides 118 may be substantially rectangular in shape, although other configurations are contemplated, such as cylindrical. In some embodiments, fiber routing guides 118 may include a fiber slot passing through a wall of the fiber routing guides 118. The fiber slot may enable an optical fiber to be inserted or removed from the fiber routing guide 118. In an example embodiment, the fiber slot may be formed at an angle relative to the direction of fiber routing, which may reduce inadvertent removal of a fiber from the fiber routing guide 118.

Referring back to FIG. 3B, two sets of optical fibers 130 are routed through fiber optic module 122. As shown, each set of the optical fibers 130A, 130B may be routed in a half of the width W of fiber optic module 122, through the fiber routing guides 118, optical filters 112, splice protector sleeves 116, fiber guides 120, and the like. The optical fibers 130 may be routed to minimize bend loss caused by sharp bending, such as by maintaining a bend radii of greater than about 15 mm. In an example embodiment, the length (L) of the fiber optic module may be about 216 mm or less.

Figure 4A:
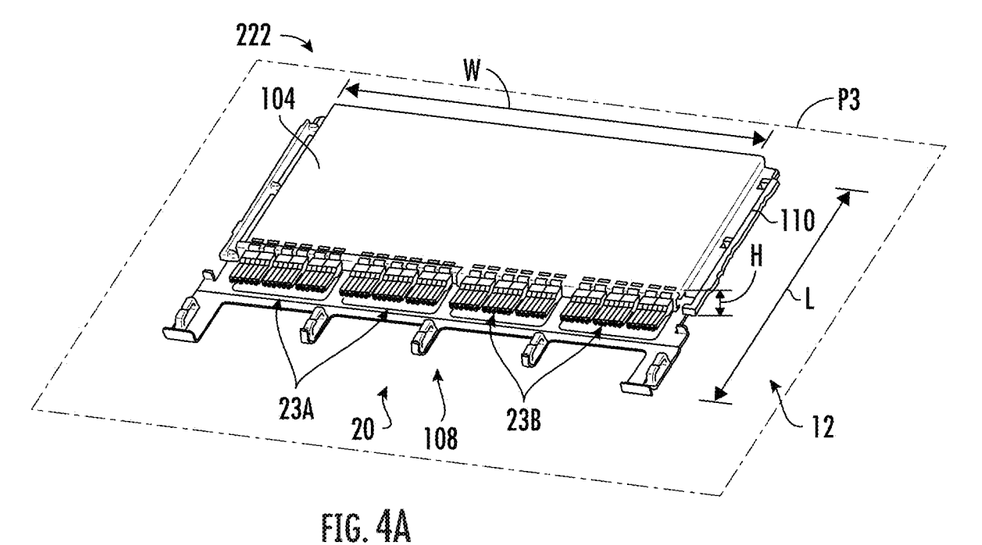
FIGS. 4A and 4B are perspective views of another embodiment of a fiber optic assembly to be used with the equipment rack of FIG. 1 in a closed and an open configuration, respectively.
Figure 4B:
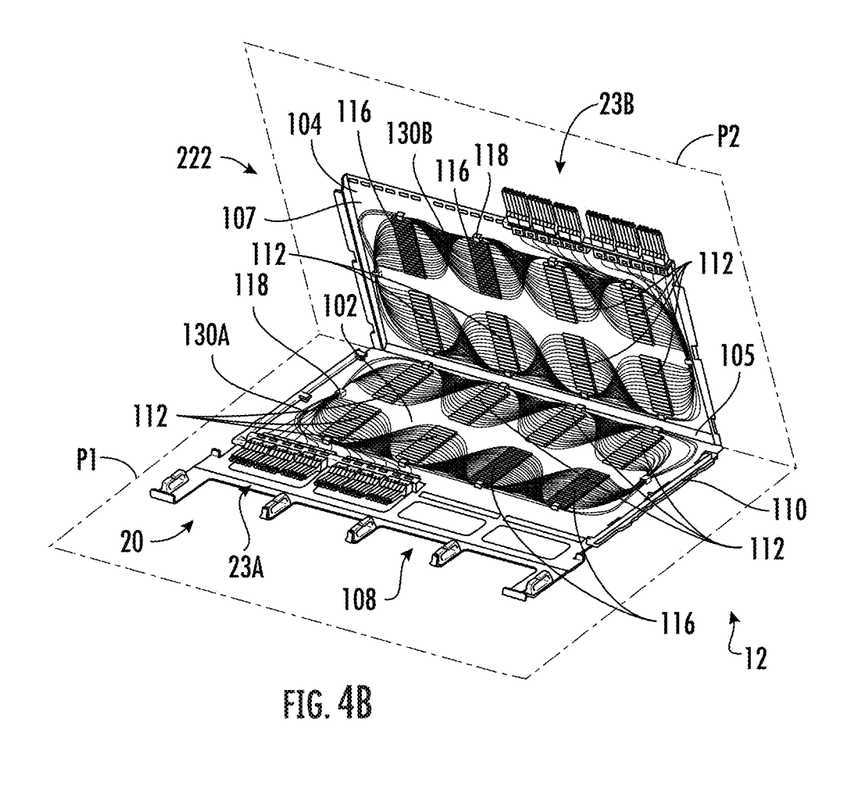

Referring now to FIGS. 4A and 4B, an alternate embodiment of a fiber optic module 222 is shown, in which like reference numbers refer to like features in the fiber optic module 122 illustrated in FIGS. 3A-3D except as noted herein. Moreover, the features of fiber optic module 222 are the same as fiber optic module 122 except as described herein.

As shown, fiber optic module 322 includes a body 102 and a cover 104 that is coupled to body 102 at a rear sidewall 105 such that body 102 and cover 104 are detachable with each other. In some embodiments, body 102 and cover 104 are hingedly coupled to each other at rear sidewall 105 such that body 102 and cover 104 are detachable with each other. Cover 104 has an interior surface 107 that is configured to cover fiber routing volume 106 and configured to provide a surface for optical fiber components as discussed in greater detail below. As shown, interior surface 107 receives one set of the optical fibers 130A, 130B. In FIG. 4B, optical fibers 130B are received in interior surface 107. However, it is within the scope of the present disclosure that optical fibers 130A could be received in interior surface 107. Interior surface 107 also includes corresponding splice protector sleeves 116, optical filters 112 with corresponding cradles 114 and configurations, and optical fiber routing guides 118 as described above with respect to FIGS. 3A-3D except as noted below. As shown in FIG. 4B, both body 102 and interior surface 107 of cover 104 include splice protector sleeves 116, optical filters 112 and corresponding cradles 114. In some embodiments, body 102 and interior surface 107 include single layers of each of splice protector sleeves 116, optical filters 112 and corresponding cradles 114 such that when fiber optic module 222 is in a closed configuration as shown in FIG. 4A, splice protector sleeves 116 and optical filters 112 are stacked onto each other. In some embodiments, like structures of body 102 and interior surface 107 are stacked upon each other. For example, splice protector sleeves 116 of interior surface 107 are stacked onto splice protector sleeves 116 of body 102, and optical filters 112 of interior surface 107 are stacked onto optical filters 112 of body 102. However, it is within the scope of the present disclosure that alternate stacking configurations may be used. Having single layers on both cover 104 and body 102 enables easy access to such structures and facilitates easy repair when needed.

FIG. 4A shows fiber optic module 222 in a closed configuration, and FIG. 4B shows fiber optic module 122 in an open configuration. Referring to FIG. 4B, body 102 and cover 104 define connection planes P1 (also known as a "first fiber optic component routing plane") and P2 (also known as a "second fiber optic component routing plane") respectively when fiber optic module 222 is in the open configuration. As shown, body 102 includes a portion of fiber optic components 23A and cover 104 includes a portion of fiber optic components 23B within connection planes P1, P2, respectively. Advantageously, such a configuration maximizes the number of fiber optic components 23A, 23B that can be installed onto body 102 and cover 104. In addition, such a configuration is malleable in that the number of fiber optic components 23A, 23B to be added (during manufacturing) onto body 102 and cover 104, respectively, is adjustable depending on the application of fiber optic module 222 due to increased space along front end 108 of body 102 and cover 104. Also, such a configuration is modular such that body 102 and cover 104 can be assembled separately and then coupled to each other after individual assembly. This may reduce manufacturing complexity and increase accessibility, thereby, increasing manufacturing speed and reducing manufacturing costs of fiber optic module 222. Fiber optic components 23A, 23B are similar to those described above as fiber optic components 23, and for the sake of brevity, description of the fiber optic components 23A, 23B is omitted.

When fiber optic module 222 is in a closed configuration shown in FIG. 4A (e.g., transitioning from an open configuration of FIG. 4B to a closed configuration of FIG. 4A), body 102, cover 104, and fiber optic components 23A, 23B of fiber optic module 222 are in a single connection plane P3 as shown.

Figures 5A, 5B:
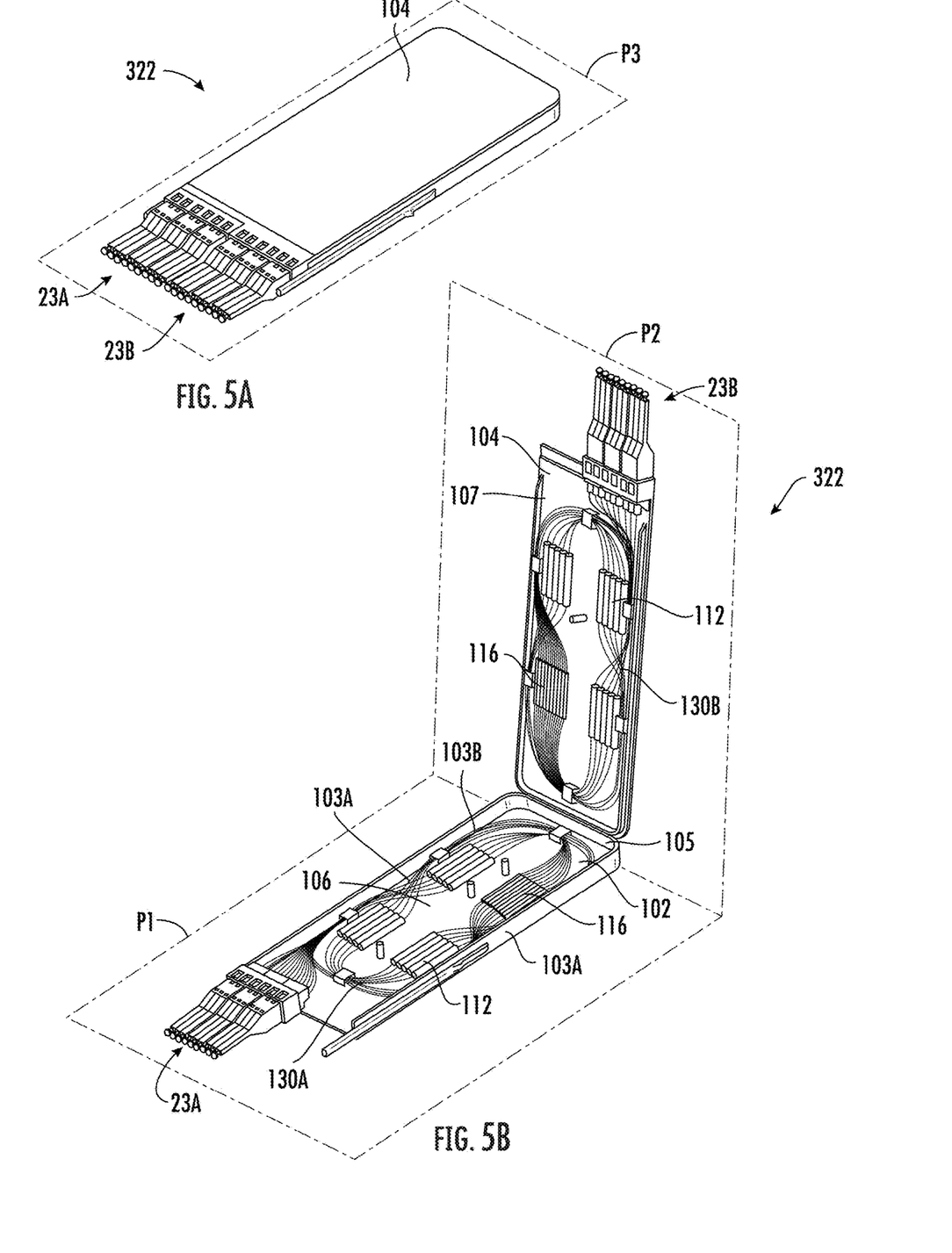
FIGS. 5A and 5B are perspective views of another embodiment of a fiber optic assembly to be used with the equipment rack of FIG. 1 in a closed and an open configuration, respectively.

Referring now to FIGS. 5A and 5B, an alternate embodiment of a fiber optic module 322 is shown, in which like reference numbers refer to like features in the fiber optic module 122 illustrated in FIGS. 3A-3D except as noted herein. Moreover, the features of fiber optic module 322 are the same as fiber optic module 122 except as described herein.

As shown and similar to fiber optic module 222 of FIGS. 4A-4B, fiber optic module 322 includes a body 102 and a cover 104 that is coupled to body 102 at a rear sidewall 105 such that body 102 and cover 104 are detachable with each other. In some embodiments, body 102 and cover 104 are hingedly coupled to each other at rear sidewall 105 such that body 102 and cover 104 are detachable with each other. Cover 104 has an interior surface 107 that is configured to cover fiber routing volume 106 and configured to provide a surface for optical fiber components as discussed in greater detail below. As shown, interior surface 107 receives one set of the optical fibers 130A, 130B. In FIG. 5B, optical fibers 130B are received in interior surface 107. However, it is within the scope of the present disclosure that optical fibers 130A could be received in interior surface 107. Interior surface 107 also includes corresponding splice protector sleeves 116, optical filters 112 with corresponding cradles 114 and configurations, and optical fiber routing guides 118 as described above with respect to FIGS. 3A-3D except as noted below. As shown in FIG. 5B, both body 102 and interior surface 107 of cover 104 include splice protector sleeves 116, optical filters 112 and corresponding cradles 114. In some embodiments, body 102 and interior surface 107 include single layers of each of splice protector sleeves 116, optical filters 112 and corresponding cradles 114 such that when fiber optic module 222 is in a closed configuration as shown in FIG. 5A, splice protector sleeves 116 and optical filters 112 are stacked onto each other. In some embodiments, like structures of body 102 and interior surface 107 are stacked upon each other. For example, splice protector sleeves 116 of interior surface 107 are stacked onto splice protector sleeves 116 of body 102, and optical filters 112 of interior surface 107 are stacked onto optical filters 112 of body 102. However, it is within the scope of the present disclosure that alternate stacking configurations may be used. Having single layers on both cover 104 and body 102 enables easy access to such structures and facilitates easy repair when needed.

FIG. 5A shows fiber optic module 122 in a closed configuration, and FIG. 5B shows fiber optic module 122 in an open configuration. Referring to FIG. 5B, body 102 and cover 104 define connection planes P1 and P2 respectively when fiber optic module 122 is in the open configuration. As shown, body 102 includes a portion of fiber optic components 23A and cover 104 includes a portion of fiber optic components 23B within connection planes P1, P2, respectively. Advantageously, such a configuration maximizes the number of fiber optic components 23A, 23B that can be installed onto body 102 and cover 104. In addition, such a configuration is malleable in that the number of fiber optic components 23A, 23B to be added (during manufacturing) onto body 102 and cover 104, respectively, is adjustable depending on the application of fiber optic module 222 due to increased space along front end 108 of body 102 and cover 104. Also, such a configuration is modular such that body 102 and cover 104 can be assembled separately and then coupled to each other after individual assembly. This can increase manufacturing speed of fiber optic module 222. Fiber optic components 23A, 23B are similar to those described above as fiber optic components 23, and for the sake of brevity, description of the fiber optic components 23A, 23B is omitted.

Similar to FIG. 4A, when fiber optic module 322 is in a closed configuration shown in FIG. 5A (e.g., transitioning from an open configuration of FIG. 5B to a closed configuration of FIG. 5A), body 102, cover 104, and fiber optic components 23A, 23B of fiber optic module 322 are in a single connection plane P3 as shown.

Moreover, fiber optic module 322 has a width W that is smaller than width W of fiber optic module 122. In particular, in some embodiments, fiber optic module 322 has a width W ranging between 80 mm and 90 mm, between 80 mm and 85 mm, or between 84 mm and 85 mm. In some embodiments, width W of fiber optic module 322 is about 84.5 mm. In some embodiments, width W of fiber optic module 322 enable three (3) fiber optic modules 322 to be seated within fiber optic equipment tray 20. In some embodiments, fiber optic module 322 has a length L and a height H that is different than fiber optic modules 122, 222. In particular, in some embodiments, fiber optic module 322 has a height H ranging between 10 mm and 15 mm, between 12 mm and 15 mm, or between 12 mm and 13 mm. In some embodiments, height H of fiber optic module 322 is about 84.5 mm. In some embodiments, fiber optic module 322 has a length L ranging between 200 mm and 205 mm, between 202 mm and 205 mm, or between 203 mm and 204 mm. In some embodiments, length L of fiber optic module 322 is about 203 mm. Fiber optic module 322 has a fiber routing volume 106 ranging between 160,000 $mm^3$ and 280,000 $mm^3$ or between 225,000 $mm^3$ and 280,000 $mm^3$. In some embodiments, fiber optic module 122 has a volume of less than $10^8$ $mm^3$, or less than $10^7$ $mm^3$.

Figure 6:
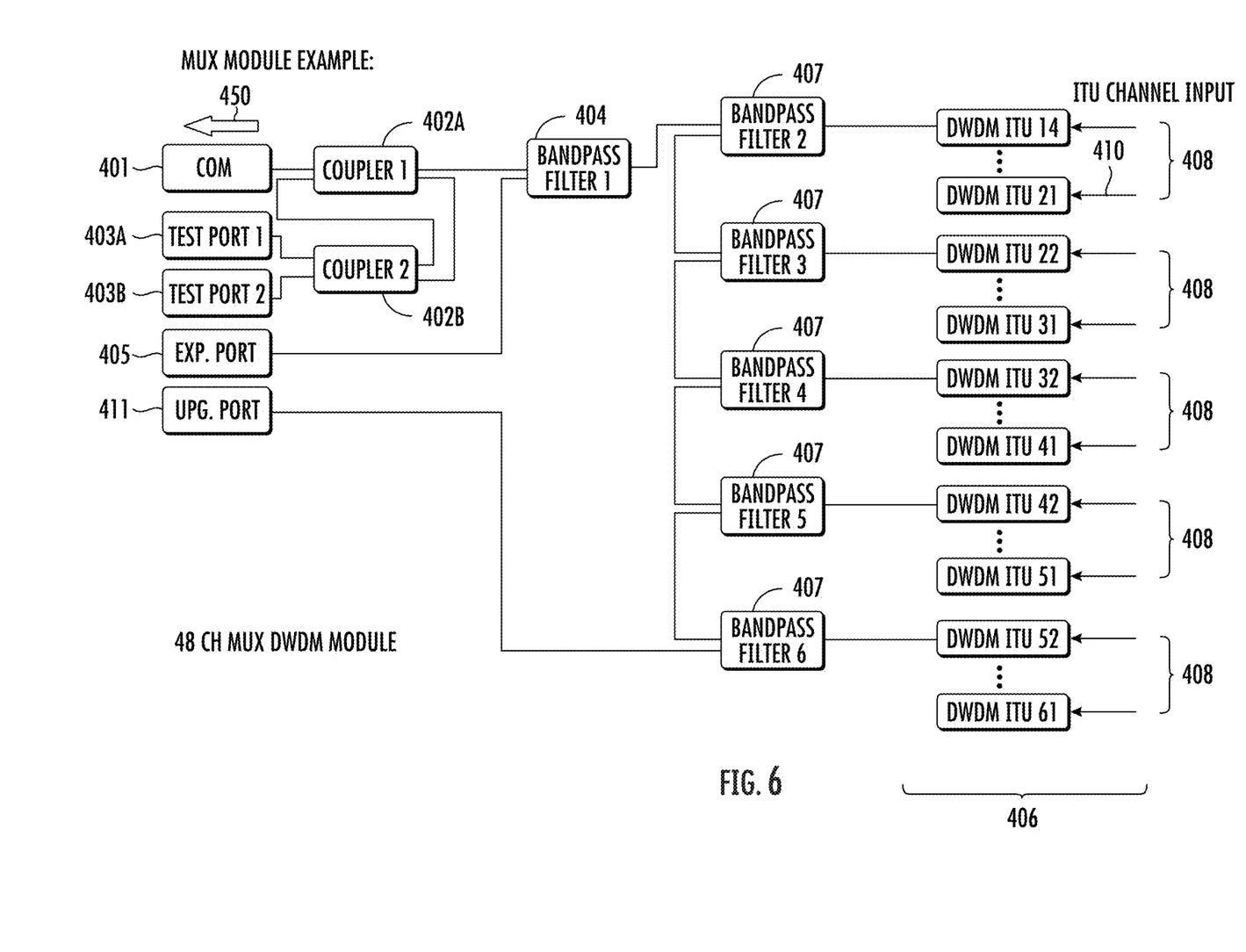
FIGS. 6 and 7 are schematic views of a forty eight (48) channel MUX and DeMUX DWDM fiber optic module, respectively.
Figure 7:
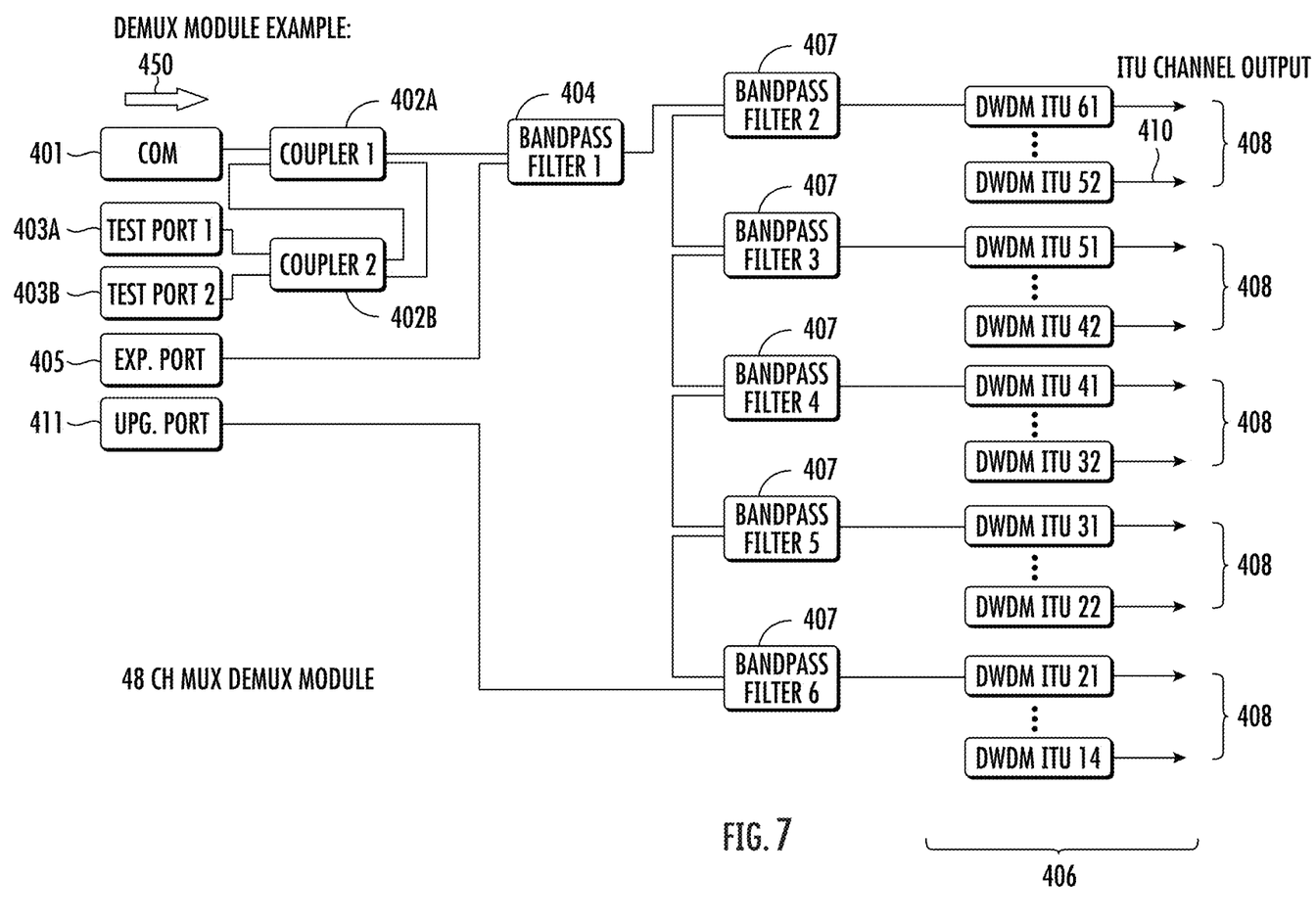
Figure 8:
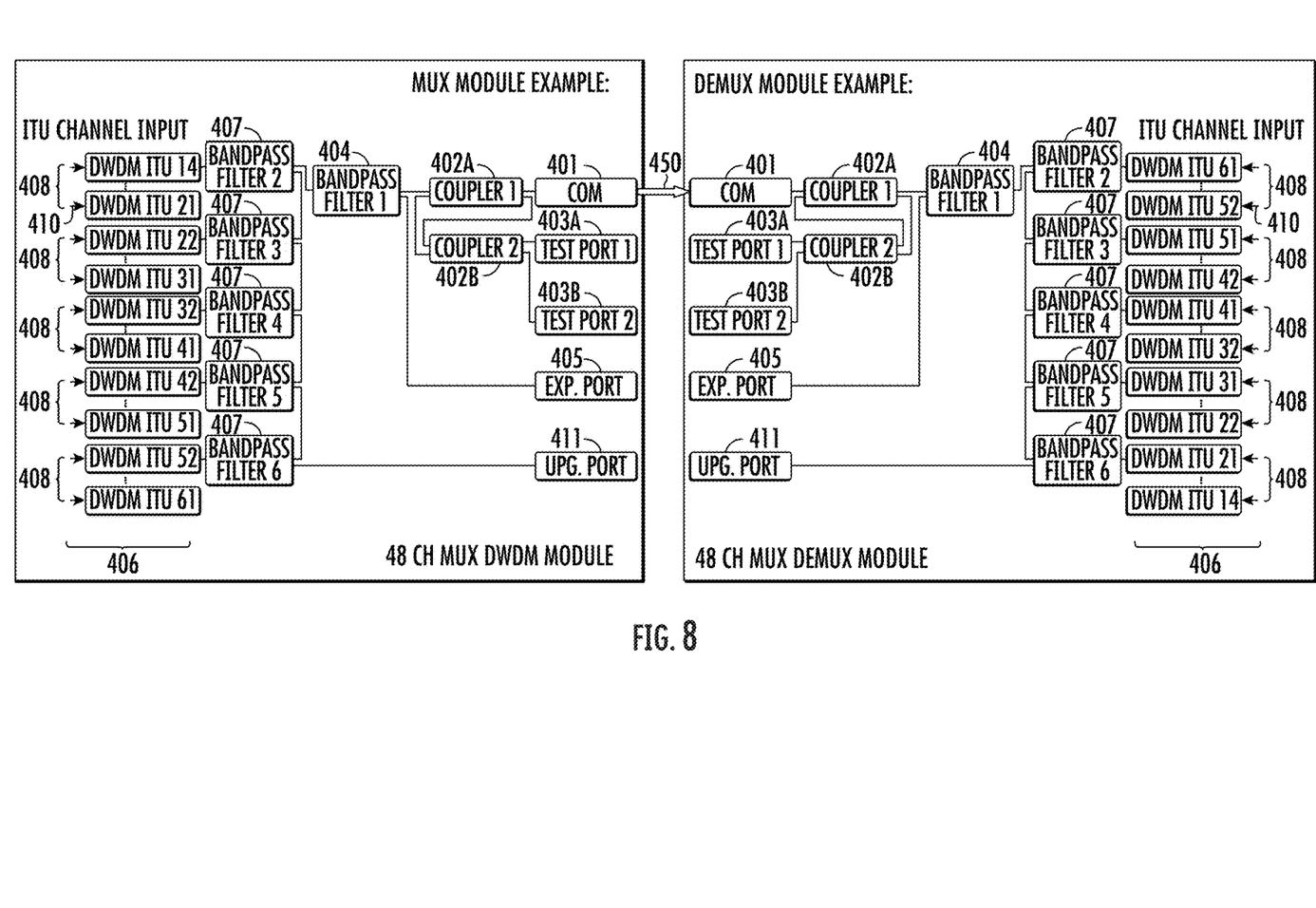
FIG. 8 illustrates the interaction of the MUX and DeMUX DWDM fiber optic modules shown in FIGS. 6 and 7, respectively, when paired.

Referring now to FIGS. 6-8, FIG. 6 illustrates a schematic view of an example of a forty eight (48) channel MUX DWDM fiber optic modules 122, 222, or 322, FIG. 7 illustrates an example fiber optic connection arrangement for the forty eight (48) channel DWDM fiber optic modules 122, 222, or 322 of FIG. 6, and FIG. 8 illustrates the interaction of the MUX and DeMUX DWDM fiber optic modules shown in FIGS. 6 and 7, respectively, when paired. As used in this disclosure, optical components being "connected to" each other refers to an optical path being established between the components. With brief reference to FIG. 7, an input fiber may be connected to a common port 401, e.g. "COM" or "CM". The input fiber may be configured to carry up to forty-eight DWDM channel signals 450 (hereinafter referred to as "optical signals 450"). The common port 401 may be in communication with one or more splitters 402, such as a 98/2 splitter 402A and a 50/50 splitter 402B that divide the optical power into two paths according to the power splitting ratio. The 50/50 splitter 402B may receive an input from both the input and output of the 98/2 splitter 402A and output the received signals to test ports 403A, 403B "T1, T2". In some embodiments, a bandpass filter may be provided between the common port 401 and the splitter 402A, 402B and/or the test port 403A, 403B. The bandpass filter may pass an optical signal used for optical time domain reflectometer (OTDR) device testing of the fiber optic modules 122, 222, or 322. In an example embodiment an isolator, such as a 1550 nm isolator, may be disposed between the 50/50 splitter 402B and a test port, such as test port 403B. While two test ports 403A, 403B are shown in FIGS. 6-8, it is within the scope of the present disclosure that in some embodiments, an alternate number of test ports 403 may be used or no test ports 403 may be used depending on the application of fiber optic modules 122, 222, 322.

An output of the 98/2 splitter 402A, may be in communication with an express bandpass filter 404. The express bandpass filter 404 may be configured to pass a signal to an express port 405 and a plurality of DWDM channels to the DWDM filters 406. Similar to test ports 403A, 403B, while one express port 405 is shown in FIGS. 6-8, it is within the scope of the present disclosure that in some embodiments, an alternate number of express ports 405 may be used or no express ports 405 may be used depending on the application of fiber optic modules 122, 222, 322. The DWDM filters 406 may include a plurality of group bandpass filters 407 configured to pass the signal for eight (8) or more adjacent DWDM channels. In some embodiments, the group bandpass filter 407 may be an eight-skip-zero (8s0) filter. Such filters can perform the function of separating a plurality of adjacent DWDM channel wavelengths, e.g. eight DWDM channels, from the optical signal. It is within the scope of the present disclosure that alternate group bandpass filters 407 may be used, such as ten-skip zero, six-skip zero, four-skip zero, and the like, for example. Moreover, it is within the scope of the present disclosure that an alternate number of group bandpass filters 407 may be used depending on the application of the fiber optic modules 122, 222, 322. The output of the group bandpass filter 407 may be in communication with a plurality of DWDM channel filters 408. Each of the DWDM channel filters 408 may be a bandpass filter configured to pass a specific DWDM channel signal. The DWDM channel filters 408 may be in communication with an output channel connection 410. In the depicted embodiment, the fiber optic modules 122, 222, 322 include output channels 14-61 corresponding to forty eight (48) DWDM channels. It is within the scope of the present disclosure that an alternate number of DWDM channel filters 408 may be used in the modules of the present disclosure depending on the application of the fiber optic modules 122, 222, 322.

In an example embodiment, the output of the last group bandpass filter 407 may also be in communication with an upgrade "Upg" port 411. The Upgrade port 411 may enable the signal for additional DWDM channels to be passed to a downstream fiber optic module. The upgrade port 411 is connected in parallel with group band pass filter 407 and the DWDM channel filter 408. Similar to test ports 403 and express ports 405, while an upgrade port 411 is shown in FIGS. 6-8, it is within the scope of the present disclosure that in some embodiments, an alternate number of upgrade ports 411 may be used or no upgrade ports 411 may be used depending on the application of fiber optic modules 122, 222, 322. In other embodiment, a group bandpass filter 407 may be disposed to pass the third group of DWDM channel signals and the remaining signal is passed to the upgrade port 211, as depicted in FIGS. 6 and 7. While the above description of the components of the fiber optic modules 122, 222, 322 has been directed to FIG. 7, the component descriptions are the same for the MUX application of FIG. 6 and will be further described below with respect to the interaction between a pairing of the MUX and DeMUX applications (FIG. 8).

As mentioned previously, FIG. 8 illustrates the interaction of the MUX and DeMUX DWDM fiber optic modules shown in FIGS. 6 and 7, respectively, when paired. As shown, MUX module combines the input signals from DWDM filters 406 and outputs optical signals 450 from the COM port 401 of the MUX module, and optical signals 450 are inputted into the COM port 401 of the DeMUX module. The optical signals 450 are then passed through the DeMUX module (through band pass filters, etc.) to the DWDM filters of the DeMUX module, and the output signals are outputted from the DeMUX module and to the end user application through the output channel connection 410.

There are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A fiber optic assembly comprising:
   a body defining a first fiber optic component routing plane;
   a cover configured to cover the body and the first fiber optic component routing plane;
   a first plurality of fiber optic components disposed in a front side of the body;
   a second plurality of fiber optic components disposed in a front side of the cover; and
   a plurality of optical filters disposed within the first fiber optic component routing plane, wherein the plurality of optical filters enable up to 450 DWDM channels;
   wherein the fiber optic assembly has a volume less than $10^8$ mm$^3$.

2. The fiber optic assembly of claim 1, wherein the body comprises a base having at least one sidewall extending therefrom, wherein the base defines a first fiber optic component routing plane, and an interior side of the cover coupled to the body and configured to cover the body, the cover defining a second fiber optic component routing plane.

3. The fiber optic assembly of claim 1, wherein the plurality of optical filters comprises a first plurality of optical filters and a second plurality of optical filters, and wherein the first plurality of optical filters is stacked on top of each other within the first fiber optic component routing plane and the second plurality of optical filters is stacked on top of each other within the second fiber optic component routing plane.

4. The fiber optic assembly of claim 3, further comprising a plurality of filter cradles disposed within the body, the plurality of filter cradles are each configured to retain some of the plurality of optical filters in two stacked rows.

5. The fiber optic assembly of claim 4, wherein the two stacked rows comprises a first row optical filters and a second row of optical filters, the second row of optical filters defines valleys between adjacent optical fibers in the second row of optical filters, and the first row of optical filters are disposed in the valleys defined by the second row of optical filters such that the first row of optical filters is offset from the second row of optical filters.

6. The fiber optic assembly of claim 2, wherein at least one optical fiber is routed from the first fiber optic component routing plane to the second fiber optic component routing plane.

7. The fiber optic assembly of claim 2, further comprising:
   a first plurality of splice protectors disposed in the first fiber optic component routing plane; and
   a second plurality of splice protectors in the second fiber optic component routing plane,
   wherein the first plurality of splice protectors are stacked on top of each other and the second plurality of splice protectors are stacked on top of each other.

8. The fiber optic assembly of claim 1, wherein the fiber optic assembly has a length between 250 mm and 650 mm.

9. The fiber optic assembly of claim 1, wherein the fiber optic assembly has a width between 250 mm and 650 mm.

10. The fiber optic assembly of claim 1, wherein the fiber optic assembly has a height between 5 mm and 25 mm.

11. The fiber optic assembly of claim 1, wherein the fiber optic assembly comprises of a single fiber optic assembly configured to fully occupy a width of a chassis.

12. The fiber optic assembly of claim 1, wherein the volume is less than $10^7$ mm$^3$.

13. A fiber optic assembly comprising:
a body defining a first fiber optic component, wherein the body comprises a base having at least one sidewall extending therefrom, wherein the base defines a first fiber optic component routing plane;
a cover coupled to the body and configured to cover the body, the cover comprising an interior side of the cover coupled to the body, the cover defining a second fiber optic component routing plane;
a first plurality of fiber optic ports disposed in a front side of the body;
a first plurality of optical filters disposed within the first fiber optic component routing plane;
a second plurality of fiber optic ports disposed in a front side of the cover; and
a second plurality of optical filters disposed within the second fiber optic component routing plane.

14. The fiber optic assembly of claim 13, wherein when the fiber optic assembly is in a closed position, the first plurality of fiber optic ports and the second plurality of fiber optic ports are in a single connection plane.

15. The fiber optic assembly of claim 13, wherein the first plurality of optical filters is stacked on top of each other within the first fiber optic component routing plane and the second plurality of optical filters is stacked on top of each other within the second fiber optic component routing plane.

16. The fiber optic assembly of claim 13, wherein the first plurality of optical filters and the second plurality of optical filters enable up to 450 DWDM channels.

17. The fiber optic assembly of claim 13, wherein at least one optical fiber is routed from the first fiber optic component routing plane to the second fiber optic component routing plane.

18. The fiber optic assembly of claim 13, further including a first plurality of splice protectors disposed in the first fiber optic component routing plane and a second plurality of splice protectors in the second fiber optic component routing plane; wherein the first plurality of splice protectors are stacked on top of each other and the second plurality of splice protectors are stacked on top of each other.

19. The fiber optic assembly of claim 13, wherein the fiber optic component routing plane is less than $10^8$ mm$^3$.

20. The fiber optic assembly of claim 13, wherein when the fiber optic assembly is in an open position, the first plurality of fiber optic ports and the second plurality of fiber optic ports are in different planes.

21. The fiber optic assembly of claim 13, wherein the first plurality of optical filters are operably connected to the first plurality of fiber optic ports and the second plurality of optical filters are operably connected to the second plurality of fiber optic ports.

* * * * *